United States Patent [19]

Pelet

[11] Patent Number: 4,757,157
[45] Date of Patent: Jul. 12, 1988

[54] HOUSING FOR AN UNDERSEA REPEATER

[75] Inventor: André Pelet, Maurepas, France

[73] Assignee: Alcatel Cit, Paris, France

[21] Appl. No.: 118,708

[22] Filed: Nov. 9, 1987

[30] Foreign Application Priority Data

Nov. 14, 1986 [FR] France .................. 86 15873

[51] Int. Cl.[4] .................. H05K 5/06; H02G 15/14
[52] U.S. Cl. .................. 174/50; 174/70 S
[58] Field of Search .......... 174/50, 70 R, 70 S; 350/96.20

[56] References Cited

U.S. PATENT DOCUMENTS

| 3,780,210 | 12/1973 | Rocton | 174/70 S |
| 4,253,729 | 3/1981 | Rocton | 174/70 S X |
| 4,601,536 | 7/1986 | Guazzo | 350/96.20 |

Primary Examiner—Laramie E. Askin
Attorney, Agent, or Firm—Sughrue, Mion, Zinn, Macpeak, and Seas

[57] ABSTRACT

The invention relates to undersea cable transmission links including submerged repeaters, and more particularly it relates to a housing for such a repeater. The repeater housing includes a very rigid, watertight metal box (12) coated with an external polyethylene sheath (124, 125, 126) preventing the box from coming into contact with sea water, and electrically isolating it from the sea environment. The coated box is placed in a tubular casing (10) which is very strong in traction. The repeater includes a metal sleeve (130) placed inside the tubular casing (10) over the outer sheath of the metal box (12) and provided with studs (11) passing through the tubular casing (10) via suitable openings. The sleeve reduces the thermal resistance of the housing by short circuiting the thermal resistance of the tubular casing to a considerable extent.

6 Claims, 3 Drawing Sheets

HOUSING FOR AN UNDERSEA REPEATER

FIELD OF THE INVENTION

The present invention relates to undersea cable transmission links fitted with submerged repeaters, and more particularly to the housings of said repeaters which must both isolate the repeater equipment from sea water while providing low thermal resistance, and withstand the traction forces exerted on the line cable while it is being laid or raised.

The invention relates more particularly to the repeater housings mentioned in particular in French Pat. No. 2,163,388 (equivalent to U.S. Pat. No. 3,780,210) which comprise a very rigid watertight metal box coated on the outside with a sheath of polyethylene and with a tubular casing of fiber/resin composite material which withstands traction forces very well, and provided at both ends with mechanical means for fixing to the line cable.

The present invention seeks to reduce the thermal resistance of the above repeater housings having a metal casing which is isolated from sea water, in particular for use with optical fiber transmission links which have repeaters that dissipate much more heat than is dissipated by prior coaxial cable links.

SUMMARY OF THE INVENTION

The present invention provides an undersea repeater housing having a very rigid, watertight metal box coated with an external sheath which is watertight and electrically insulating and which is placed in a tubular casing of fiber-resin composite material which is very strong in traction and which resists corrosion well. The housing includes a metal sleeve placed inside the tubular casing over the outer sheath of the metal box and provided with studs also made of metal which are distributed around its external periphery and which pass through the tubular casing via suitable openings and which come into contact with the surrounding sea water.

The metal sleeve is preferably made of a copper or aluminum alloy having sufficient thickness, e.g. about 10 mm, to withstand corrosion during the expected lifetime of the link. It is advantageously made in the form of two smooth half-shells which close around the sheathed metal box, with the studs being constituted by pieces which are screwed on from outside the casing.

BRIEF DESCRIPTION OF THE DRAWINGS

Other characteristics and advantages of the invention appear from the following description of an embodiment given by way of example. The description is made with reference to the accompanying drawings, in which.

MORE DETAILED DESCRIPTION

Figure 1:
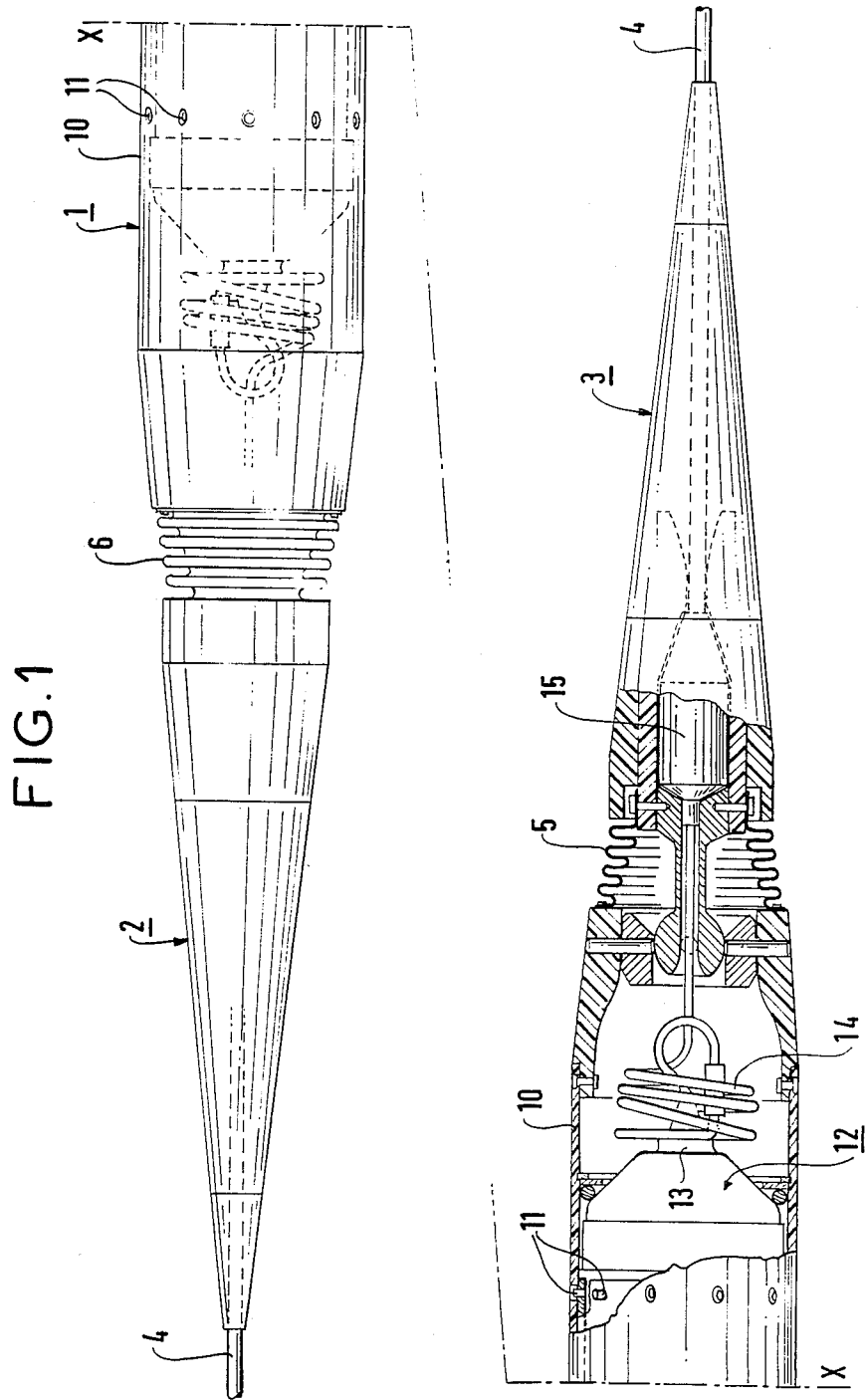
FIG. 1 shows an undersea repeater fitted with a housing in accordance with the invention seen in elevation and in partial section and drawn, for the sake of convenience, as two separate halves.

As can be seen in FIG. 1, an undersea repeater is generally in the form of a tubular housing 1 extended at each of its two ends by devices 2, 3 for connection with the line cable 4, said devices being generally conical on the outside and having joints which are covered by bellows 5, 6.

The tubular housing 1 shown in FIG. 1 is of the type having a very rigid watertight internal metal box which is isolated from sea water. On the outside it appears in the form of a tubular casing 10 made of fiber/resin composite, e.g. a glass fiber/epoxy resin composite, and two rings of metal studs 11 remain visible.

The casing 10 is very strong in traction and provides the mechanical connection between the connection devices 2 and 3. Inside the casing 10 there is a very rigid watertight metal box 12 which contains the repeater equipment and which has stub cables 14 passing out therefrom through sealed feed-throughs 13 with the stub cables being connected, while the line cable is being laid, to cable heads 15 which run on into the connection devices 2 and 3 at both ends.

Figure 2:
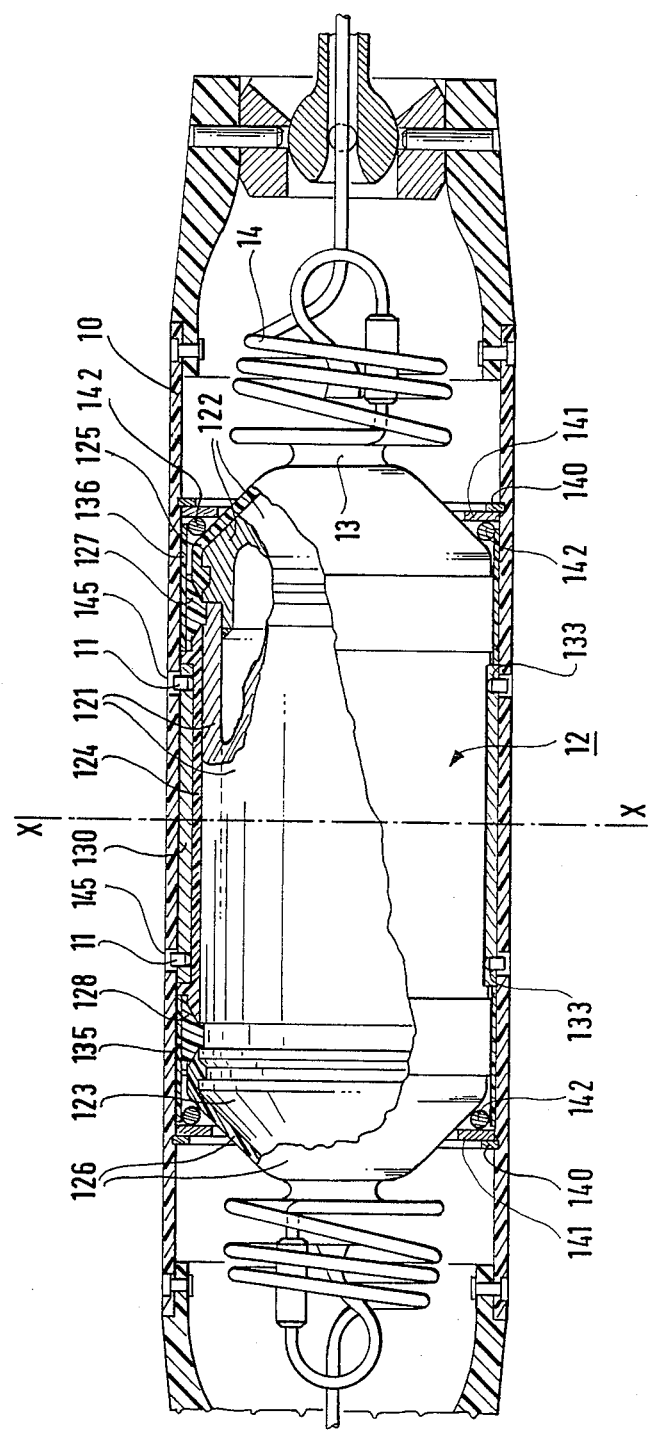
FIG. 2 is a longitudinal section through a portion of the repeater housing shown in the preceding figure.

The metal box, which is shown in greater detail in FIG. 2, comprises a cylindrical body 121 which is closed at its ends by round lids 122 and 123 each of which has a sealed feedthrough in its center for a stub cable. The cylindrical body 121 and the lids 122 and 123 are covered on the outside by respective sheaths of molded polyethylene 124, 125, and 126, together with two strips of polyethylene 127 and 128 molded over the connections therebetween in order to prevent sea water coming into contact with the outside wall of the box, thus electrically isolating the box.

The central portion of the body 121 of the metal box surrounded by its insulating polyethylene sheath 124 is clamped inside a metal sleeve 130 made of an aluminum or a copper alloy, for example, and about 10 mm thick, said thickness being sufficient to withstand corrosion during the expected lifetime of the link, and said sleeve having two rings of ten holes 133 passing therethrough, said holes being partially tapped from the outside in for the purpose of fixing the studs 11.

The ends of the body 121 of the metal box and its connections to the lids 122 and 123 are covered by two socks of flexible material 135 and 136 which are threaded over the strips of polyethylene 127 and 128 in order to prevent any rubbing thereagainst.

Once wrapped in this way, the metal box 12 is placed inside the tubular casing 10 and is held in position by a system of annular wedges 140, 141, 142 which bear against inside grooves in the tubular casing 10 and on the lids 122 and 123 covered with their sheaths 125 and 126.

The tubular casing 10 of glass fiber and epoxy resin composite has openings 145 level with the holes 133 through the metal sleeve 130 and the studs 11 are received therein, which studs are in the form of headless screws that do not project outside the casing in order to avoid any projections which could get in the way of repeater handling while the link is being laid or raised.

Figure 3:
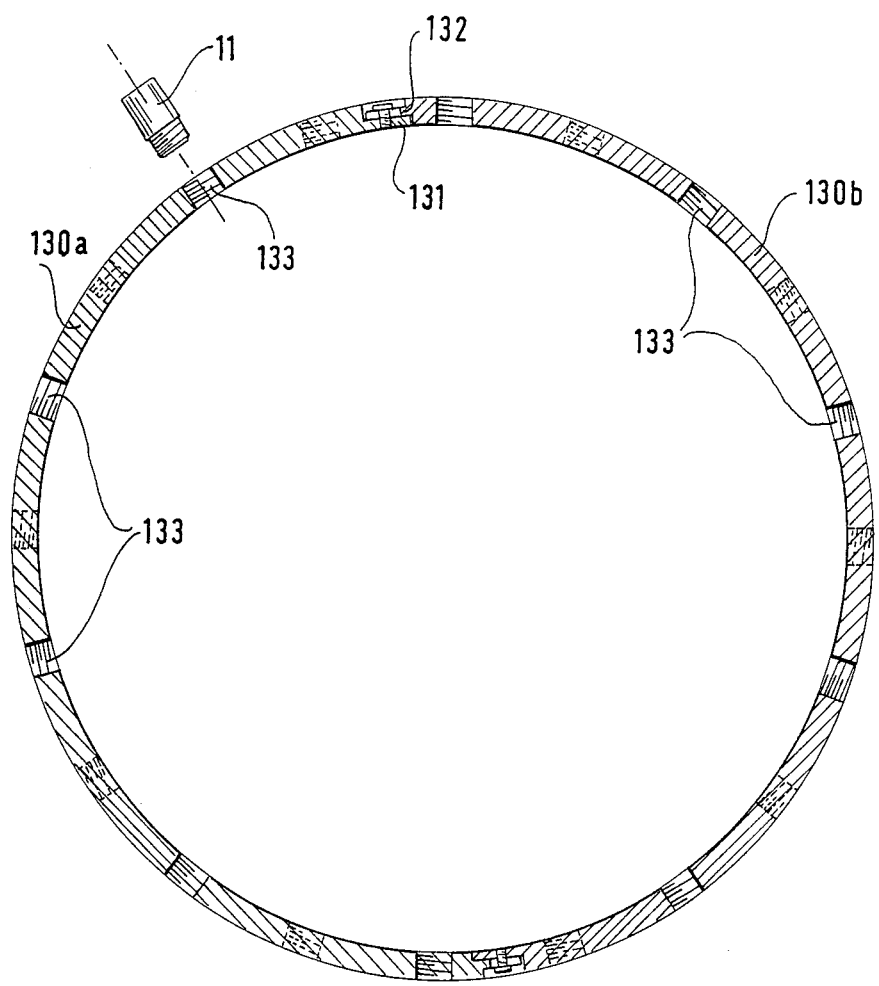
FIG. 3 is a cross-section through a metal sleeve belonging to the housing shown in the preceding figures.

FIG. 3 shows how the metal sleeve 130 comprises two half-shells 130a and 130b each of which is semi-cylindrical in shape, with inter-fitting longitudinal edges 131 and 132 which are bolted together, and each of which has two half-rings of holes 133, only one of which is shown in the figure.

The metal sleeve 130 collects the heat from the metal box and the studs 11 serve to dump it into sea water, thereby to a large extent short-circuiting the thermal resistance of the tubular casing 10 whose composite material is a poor conductor of heat. The number of studs 11 and the diameters thereof are limited by the number and diameter of the openings 145 which can be formed through the tubular casing 10 without excessively weakening its mechanical strength in traction. However, this limitation is not very severe in practice and may be pushed back by providing the openings when the composite is made.

It may be observed that with a housing structure as described having a casing with a diameter of 350 mm, the thermal resistance of the housing has been reduced by more than half.

Without going beyond the scope of the present invention, it is possible to modify various dispositions or to replace various means by equivalent means.

In particular, the studs 11 may be fixed to the metal sleeve 130 in the same way as pop rivets, in which case there is no point in tapping the holes 133 through the half-shells.

I claim:

1. An undersea repeater housing having a watertight metal box suitable for withstanding pressure and coated with an external sheath which is watertight and electrically insulating and which is placed in a tubular casing of fiber-resin composite material which is very strong in traction and which resists corrosion well, the housing further including a metal sleeve placed inside the tubular casing over the outer sheath of the metal box and provided with studs also made of metal which are distributed around its external periphery and which pass through the tubular casing via suitable openings and which come into contact with the surrounding sea water.

2. A housing according to claim 1, wherein sid metal sleeve is about 10 mm thick.

3. A housing according to claim 1, wherein said metal sleeve is constituted by two half-shells which are semicylindrical in shape.

4. A housing according to claim 3, wherein sid half-shells have inter-fitting longitudinal edges.

5. A housing according to claim 3, wherein said half-shells are smooth and have holes passing therethrough for fixing the studs.

6. A housing according to claim 5, wherein said holes are partially tapped from the outside, with the studs being constituted by screws.

* * * * *